US009436203B2

(12) United States Patent
Ecker et al.

(10) Patent No.: US 9,436,203 B2
(45) Date of Patent: Sep. 6, 2016

(54) METHOD AND APPARATUS FOR REGULATOR CONTROL

(71) Applicant: Marvell World Trade Ltd., St. Michael (BB)

(72) Inventors: Reuven Ecker, Haifa (IL); Ido Bourstein, Pardes Hana (IL)

(73) Assignee: Marvell World Trade Ltd., St. Michael (BB)

( * ) Notice: Subject to any disclaimer, the term of this patent is extended or adjusted under 35 U.S.C. 154(b) by 433 days.

(21) Appl. No.: 14/048,189

(22) Filed: Oct. 8, 2013

(65) Prior Publication Data

US 2014/0097694 A1 Apr. 10, 2014

Related U.S. Application Data

(60) Provisional application No. 61/710,862, filed on Oct. 8, 2012.

(51) Int. Cl.
*H02J 1/00* (2006.01)
*H02J 3/00* (2006.01)
*G05F 3/02* (2006.01)
*G05F 3/08* (2006.01)

(52) U.S. Cl.
CPC . *G05F 3/02* (2013.01); *G05F 3/08* (2013.01); *Y10T 307/702* (2015.04)

(58) Field of Classification Search
CPC .......... H02J 3/383; H02J 1/102; H02J 3/385; H02J 1/00; H02J 3/38; H02J 3/46; H02J 3/386; H02J 1/10; H02J 3/36; H02J 7/35; H02J 3/00; H02J 3/18; H02J 3/32; H02J 4/00; H02J 1/12
USPC .......................................... 307/82, 81
See application file for complete search history.

(56) References Cited

U.S. PATENT DOCUMENTS 7,119,398 B1 10/2006 Bakker
7,259,480 B2 * 8/2007 May .......................... H02J 1/08 307/82
8,159,089 B2 * 4/2012 Akaho .................... H02M 3/07 307/82
2005/0194839 A1 * 9/2005 Amerom ................ G06F 1/263 307/82
2008/0164765 A1 7/2008 Illegems
(Continued)

FOREIGN PATENT DOCUMENTS

CN 101175227 A 5/2008
JP 2010-224825 A 10/2010

OTHER PUBLICATIONS

Combined Office Action and Search Report issued Feb. 24, 2016 in Chinese Patent Application No. 201310726089.5 (with English language translation and English Translation of Category of Cited Documents).

*Primary Examiner* — Carlos Amaya
*Assistant Examiner* — Esayas Yeshaw

(57) ABSTRACT

Aspects of the disclosure provide an integrated circuit (IC) chip that includes a feedback control circuit and a detecting circuit. The feedback control circuit is configured to govern a feedback signal to a first regulator that regulates a first power supply to the IC chip based on the feedback signal. The feedback control circuit is powered at least partially by a second power supply. The detecting circuit is configured to detect a power down of the second power supply, and to cause the feedback control circuit to be disengaged from the feedback signal in response to the power down.

20 Claims, 4 Drawing Sheets

(56) References Cited

U.S. PATENT DOCUMENTS

2011/0194316 A1* 8/2011 Morota ............ H02M 3/33523 363/21.17
2011/0210758 A1* 9/2011 Zhang ............. G01R 19/16552 324/705
2011/0267843 A1* 11/2011 Djenguerian ..... H02M 3/33507 363/21.01
2012/0087199 A1* 4/2012 Tejada ..................... G05F 3/02 365/227
2013/0154709 A1* 6/2013 Huang .................. H03K 3/012 327/205

* cited by examiner

METHOD AND APPARATUS FOR REGULATOR CONTROL

INCORPORATION BY REFERENCE

This present disclosure claims the benefit of U.S. Provisional Application No. 61/710,862, "SAFE ACTIVE CONTROL OF REGULATOR'S ANALOG FEEDBACK SIGNAL" filed on Oct. 8, 2012, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various electronic devices receive one or more supply voltages from voltage regulators that are external to the electronic devices. In an example, an integrated circuit (IC) chip receives the one or more supply voltages from an external voltage regulator. The IC chip provides to the voltage regulator a feedback signal based on the supply voltage input to the IC chip. The voltage regulator regulates the supply voltage to the IC chip based on the feedback signal. Improper power down of the IC, such as typically happens in the event of a power crash, for example, may have detrimental effects on the IC.

SUMMARY

Aspects of the disclosure provide an integrated circuit (IC) chip that includes a feedback control circuit and a detecting circuit. The feedback control circuit is configured to govern a feedback signal to a first regulator that regulates a first power supply to the IC chip based on the feedback signal. The feedback control circuit is powered at least partially by a second power supply. The detecting circuit is configured to detect a power down of the second power supply, and to cause the feedback control circuit to be disengaged from the feedback signal in response to the power down.

In an example, the IC chip includes a circuit configured to provide the feedback signal based on the first power supply when the feedback control circuit is disengaged from the feedback signal. In another example, the circuit is external to the IC chip.

According to an aspect of the disclosure, the feedback control circuit includes a driving circuit configured to be powered by the second power supply to drive the feedback signal, and an enable/disable circuit configured to disable the driving circuit in response to the power down of the second power supply in order to disengage the feedback control circuit from the feedback signal. Further, in an embodiment, the feedback control circuit includes a feedback generation circuit configured to determine an adjustment to the first power supply. The feedback signal is generated based on the adjustment and the first power supply. In an example, the feedback generation circuit is configured to gradually change output to zero as the adjustment in response to the power down of the second power supply. For example, the feedback generation circuit is configured to gradually change the output to zero as the adjustment before the enable/disable circuit disables the feedback driving circuit.

Further, in an embodiment, the driving circuit is configured to have a higher output impedance than a passive circuit in response to the power down of the second power supply and to cause the driving circuit to be disengaged from the feedback signal.

In an example, the first power supply provides power to digital circuitry in the IC chip and the second power supply provides power to analog circuitry in the IC chip. The second power supply is independent of the first power supply.

Aspects of the disclosure provide a method. The method includes detecting a power down of a second power supply that at least partially powers a feedback control circuit. The feedback control circuit adjusts a feedback signal to a regulator that regulates a first power supply based on the feedback signal. The method further includes causing the feedback control circuit to be disengaged from the feedback signal in response to the power down of the second power supply.

Aspects of the disclosure provide a system including a first regulator, a second regulator and an integrated circuit (IC) chip. The first regulator is configured to provide a first power supply for the IC chip based on a feedback signal. The second regulator is configured to provide a second power supply. The IC chip is configured to operate based on the first power supply and the second power supply. The IC chip includes a feedback control circuit and a detecting circuit. The feedback control circuit is configured to govern the feedback signal to the first regulator. The feedback control circuit is powered at least partially by the second power supply. The detecting circuit is configured to detect a power down of the second power supply, and to cause the feedback control circuit to be disengaged from the feedback signal in response to the power down.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
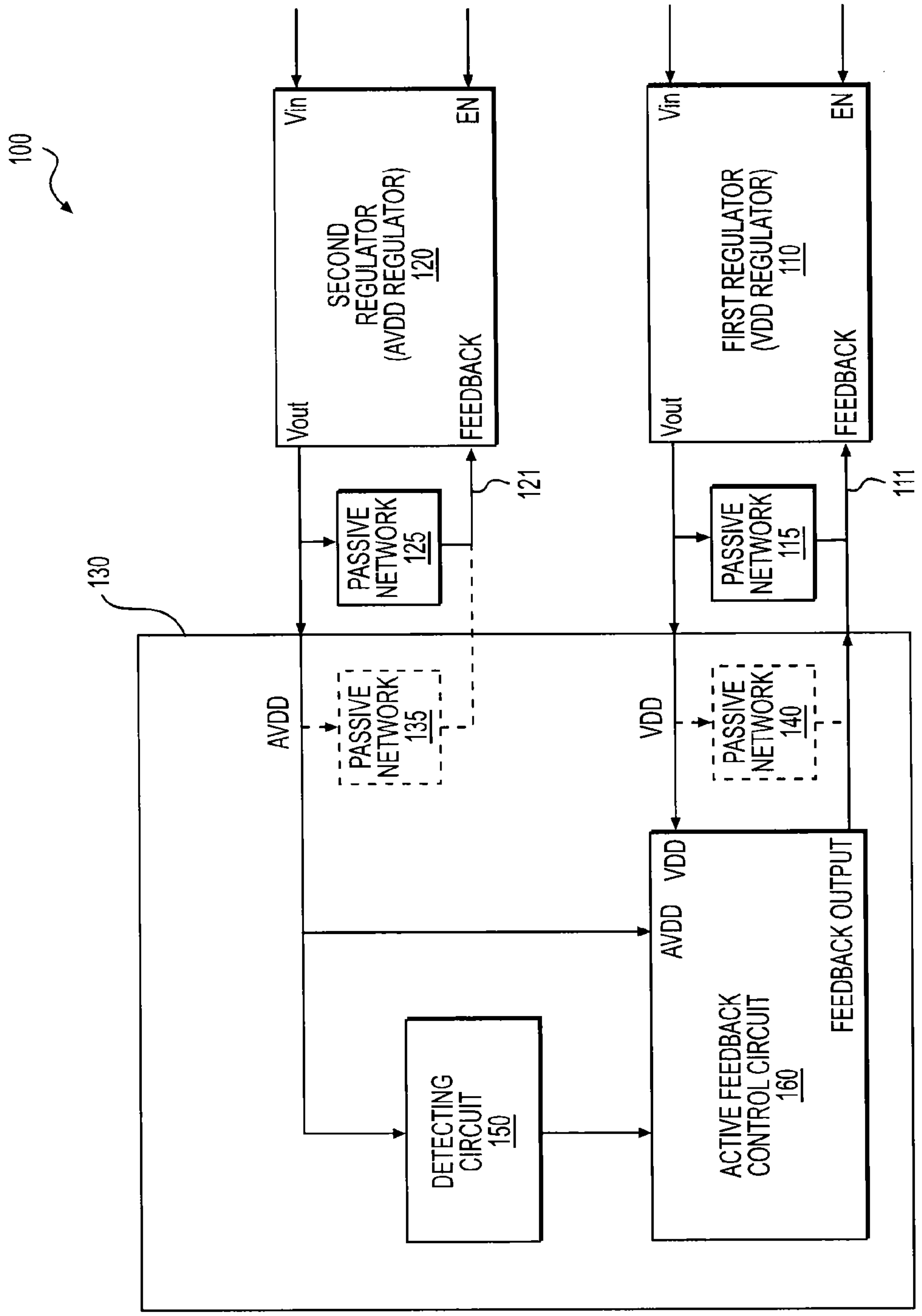
FIG. 1 shows a block diagram of an electronic system example 100 according to an embodiment of the disclosure.

FIG. 1 shows a block diagram of an electronic system example 100 according to an embodiment of the disclosure. The electronic system 100 includes an integrated circuit (IC) chip 130, a first voltage regulator 110 and a second voltage regulator 120 coupled together as shown in FIG. 1. The first voltage regulator 110 provides a first supply voltage VDD to the IC chip 130, and the second voltage regulator 120 provides a second supply voltage AVDD to the IC chip 130.

The first supply voltage VDD and the second supply voltage AVDD can have the same voltage level or different voltage levels. In an embodiment, the second supply voltage AVDD has a higher voltage level than the first supply voltage VDD. In an example, the IC chip 130 includes digital circuits and analog circuits. The digital circuits are connected to the first supply voltage VDD and are powered based on the first supply voltage VDD. The analog circuits are connected to the second supply voltage AVDD and are powered based on the second supply voltage AVDD. In the FIG. 1 example, the first supply voltage VDD and the second supply voltage AVDD are supplied by separate/independent regulators as seen. In another example, the first supply voltage VDD and the second supply voltage AVDD are supplied by a single regulator that is capable of providing suitable independently controlled regulated voltages.

Generally, a voltage regulator and a feedback control circuit form a feedback loop to generate and stabilize a supply voltage. The feedback control circuit generates the feedback signal as a function of the supply voltage and other suitable parameters. The voltage regulator regulates the supply voltage based on the feedback signal. Further, in an embodiment, the generation of the feedback signal also relies on operations of another voltage regulator. A power-down of the other voltage regulator can cause losing control of the feedback signal generation, then the voltage level of the feedback signal is no longer a function of the supply voltage and may drop to zero for example, and the feedback loop is broken. When the voltage regulator is still in operation, in the absence of feedback from the IC chip, the voltage regulator can excessively increase the supply voltage and thus cause voltage stress on circuits that operate based on the supply voltage.

In the FIG. 1 example, the IC chip 130 includes an active feedback control circuit 160. The first voltage regulator 110 and the active feedback control circuit 160 form a feedback loop. The active feedback control circuit 160 generates a first feedback signal 111 as a function of the first supply voltage VDD, and the first voltage regulator 110 regulates the first supply voltage VDD based on the first feedback signal 111. Further, the generation of the first feedback signal 111 by active feedback control circuit 160 at least partially relies on the second supply voltage AVDD output from the second voltage regulator 120. The electronic system 100 is configured to disengage the first feedback signal 111 from the active feedback control circuit 160 in response to a power down of the second voltage regulator 120, such that the first feedback signal 111 no longer relies on the second supply voltage AVDD. Further, in an example, when the second voltage regulator 120 is powered down, but the first voltage regulator 110 is still in operation, the first feedback signal 111 is generated as a function of the first supply voltage VDD by a circuit, such as a passive circuit, and the like that does not operate based on the second supply voltage AVDD. In an embodiment because the second supply voltage AVDD is powered down, the regular feedback loop is no longer functional, and an alternative feedback that bypasses the second supply voltage AVDD and is based on the first supply voltage VDD, is generated. The first voltage regulator 110 and the circuit that generates the alternative feedback still form an alternative feedback loop, and the first supply voltage VDD is controlled by the alternative feedback loop in a safe range not to voltage stress the circuits in the IC chip 130.

In an embodiment, the second voltage regulator 120 is coupled with a passive network 125 external to the IC chip 130 to form a feedback loop to stabilize the second supply voltage AVDD. In another embodiment, the second voltage regulator 120 is coupled with a passive network 135 within the IC chip 130 to form a feedback loop to stabilize the second supply voltage AVDD. In the example, the second voltage regulator 120 includes a plurality of input/output elements, such as a Vin pin, an EN pin, a Vout pin and a FEEDBACK pin, and the like. The Vin pin receives a power supply from a power source, the EN pin receives an enable signal that enables or disables the operations of the second voltage regulator 120, the FEEDBACK pin receives a second feedback signal 121, and the Vout pin outputs the second supply voltage AVDD to the IC chip 130.

The second feedback signal 121 is generated for example by the passive network 125 as a function of the second supply voltage AVDD. In an example, the passive network 125 includes a plurality of resistors that form a voltage divider to generate the second feedback signal 121 by dividing the second supply voltage AVDD. Thus, the second feedback signal 121 is indicative of the voltage level for the second supply voltage AVDD.

Further, in an embodiment, when the second voltage regulator 120 is enabled, the second voltage regulator 120 compares the second feedback signal 121 with a reference voltage (not shown), and adjusts the power driven out of the Vout pin based on the comparison. In an example, when a load current increase causes a voltage drop on the second supply voltage AVDD, the second feedback signal 121 has a reduced voltage level. When the voltage level of the second feedback signal 121 is lower than the reference voltage, the second voltage regulator 120 increases the power driven output from the Vout pin to satisfy the increase of the load current. When a load current decrease causes a charge build-up that raises the second supply voltage AVDD, the second feedback signal 121 has an increased voltage level. When the voltage level of the second feedback signal 121 is higher than the reference voltage, the second voltage regulator 120 decreases the power driven output of the Vout pin.

In the FIG. 1 example, the first voltage regulator 110 also includes a plurality of input/output elements, such as a Vin pin, an EN pin, a Vout pin and a FEEDBACK pin, and the like. The Vin pin receives a power supply from a power source, the EN pin receives an enable signal that enables or disables the operations of the first voltage regulator 110, the FEEDBACK pin receives the first feedback signal 111, and the Vout pin outputs the first supply voltage VDD to the IC chip 130.

According to an aspect of the disclosure, when both the first voltage regulator 110 and the second voltage regulator 120 are enabled and in operation, the first feedback signal 111 is generated at least partially based on the second supply voltage AVDD. In an example, the first feedback signal 111 is generated by a circuit that is partially powered by the second supply voltage AVDD. In an embodiment, the electronic system 100 uses an adaptive voltage scaling (AVS) technique to regulate the first supply voltage VDD to the IC chip 130 to enable circuits in the IC chip 130 to meet circuit performance requirement, such as disclosed in Applicant's U.S. Pat. No. 8,370,654, issued Feb. 5, 2013 and assigned to Marvell, which is incorporated herein by reference in its entirety. For example, the active feedback control circuit 160 adjusts a voltage level of the first feedback signal 111 based on monitored circuit parameters, such as a digital readout value from a digital ring oscillator (DRO) monitoring device (not shown), a voltage level of a power grid within the IC chip 130, a temperature on the IC chip 130 and the like.

Further, in an embodiment, when the first voltage regulator 110 is enabled, the first voltage regulator 110 compares the first feedback signal 111 with a reference voltage (not shown), and adjusts the power driven out of the Vout pin based on the comparison. In an embodiment, the voltage level of the first feedback signal 111 is set based on performance of a circuit, for example as function of a speed determined from a ring oscillator. In an example, the IC chip 130 includes a ring oscillator (not shown) that operates based on the first supply voltage VDD. The frequency of the ring oscillator is indicative of a circuit speed in the IC chip 130. When the frequency of the ring oscillator is lower than a threshold, the active feedback control circuit 160 reduces the voltage level of the first feedback signal 111. When the voltage level of the first feedback signal 111 is lower than the reference voltage, the first voltage regulator 110 increases the power driven out of the Vout pin, and thus increases the first supply voltage VDD. The increase of the first supply voltage VDD increases circuit speed and the frequency of the ring oscillator also increases.

According to an aspect of the disclosure, the active feedback control circuit 160 is powered at least partially based on the second supply voltage AVDD in an embodiment. Thus, the control of the first feedback signal 111 depends on the operation of the second voltage regulator 120. In the FIG. 1 example, the IC chip 130 is configured to detect a power down of the second voltage regulator 120 and disengage the first feedback signal 111 from the active feedback control circuit 160 in response to the detected power down, such that the first feedback signal 111 is independent of the second voltage regulator 120.

Specifically, in the FIG. 1 example, the IC chip 130 includes a detecting circuit 150 configured to detect a power down of the second voltage regulator 120. When the power down is detected, the detecting circuit 150 informs the active feedback control circuit 160, and causes the first feedback signal 111 to be disengaged from the active feedback control circuit 160. Further, in an example, when the first feedback signal 111 is disengaged from the active feedback control circuit 160, the voltage level of the electronic system 100 is governed as a function of the first supply voltage VDD by a passive circuit, such as a passive network 115 external to the IC chip 130, a passive network 140 in the IC chip 130, and the like. In an example, the passive network 115 includes one or more resistors. In an embodiment, the passive circuit is selectively coupled with the first voltage regulator 110 when the first feedback signal 111 is disengaged from the active feedback control circuit 160. In another embodiment, the passive circuit is coupled with the first voltage regulator 110 and is configured to have a resistivity between a low output impedance and a high output impedance (e.g. high-Z, tri-stated, floating) of the active feedback control circuit 160. When the active feedback control circuit 160 drives the first feedback signal 111, the active control circuit 160 has the low output impedance and the passive circuit does not significantly affect the first feedback signal 111. When an output buffer of the active feedback control circuit 160 is in the high-Z state that has the high output impedance, the first feedback signal 111 is governed by the first supply voltage VDD via the passive circuit.

It is noted that in an example, the first voltage regulator 110 is powered down before the second voltage regulator 120, because the second feedback signal 121 does not rely on the first supply voltage VDD, the second voltage regulator 120 can continue operation without causing voltage stress.

Figure 2:
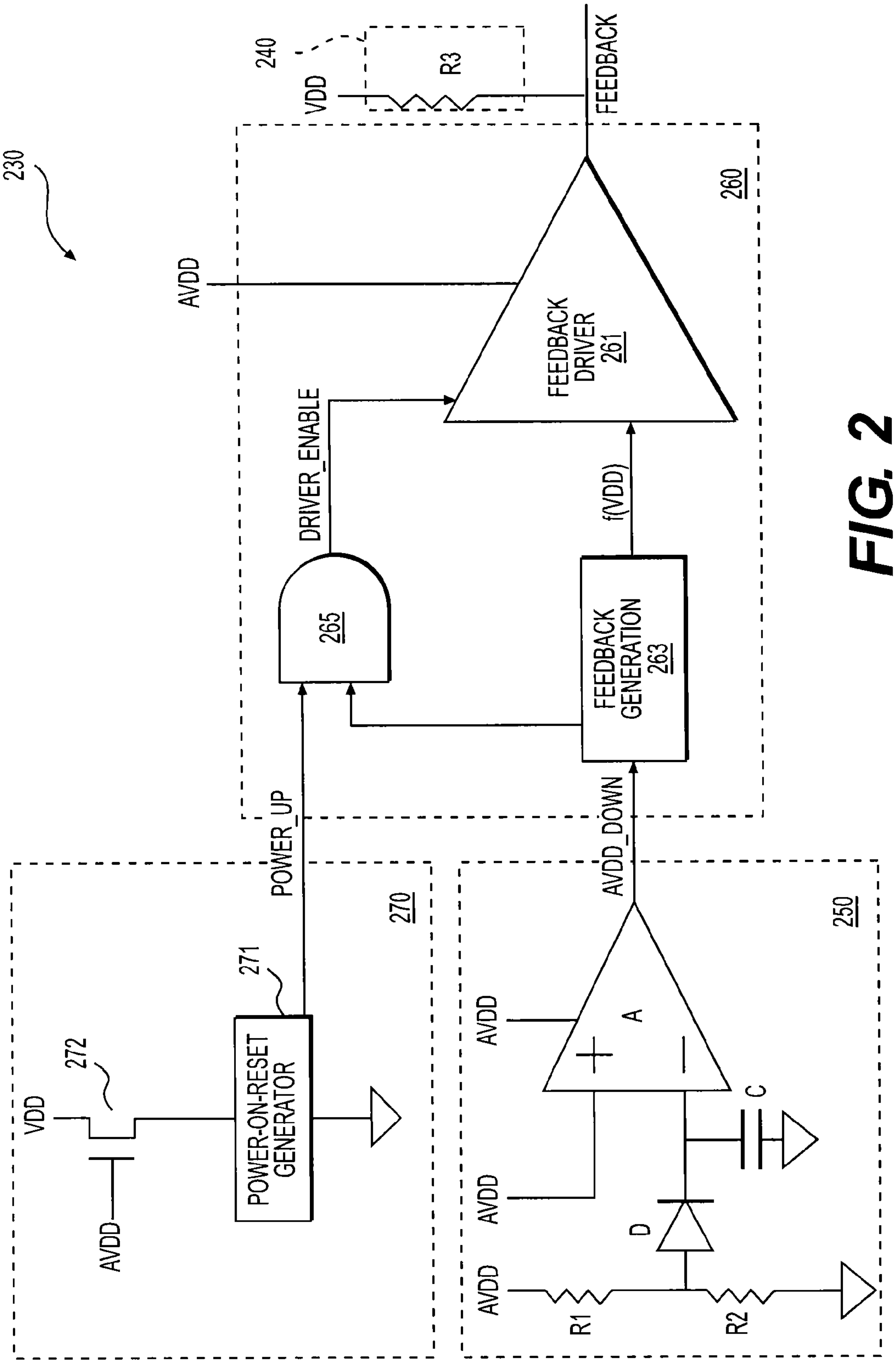
FIG. 2 shows a diagram of a circuit example 230 according to an embodiment of the disclosure.

FIG. 2 shows a block diagram of an IC chip 230 according to an embodiment of the disclosure. In an embodiment, the IC chip 230 is a detailed example of the IC chip 130 in FIG. 1, and can be coupled with the first voltage regulator 110 and the second voltage regulator 120 as shown in FIG. 1. The IC chip 230 includes a power-up detecting circuit 270, a power-down detecting circuit 250, an active feedback control circuit 260, and a passive circuit 240. These elements are coupled together as shown in FIG. 2, in an embodiment.

The IC chip 230 operates based on a first supply voltage VDD, for example provided by the first voltage regulator 110, and a second supply voltage AVDD, for example provided by the second voltage regulator 120. In addition, the IC chip 230 is configured to enable safe operation and to avoid voltage stress in response to power-up and power-down.

The power-up detecting circuit 270 is configured to detect a power up of both the first supply voltage VDD and the second supply voltage AVDD, and to generate a signal to inform other circuits, such as the active feedback control circuit 260 and the like, to start operation in response to the power-up of both the first supply voltage VDD and the second supply voltage AVDD. In the FIG. 2 example, the power-up detecting circuit 270 includes a transistor 272 and a power-on-reset generator 271 coupled together as shown in FIG. 2. The operations of the power-up detecting circuit 270 are disclosed in Applicant's U.S. Pat. No. 8,370,654, issued Feb. 5, 2013 and assigned to Marvell, which is incorporated herein by reference in its entirety.

The power-down detecting circuit 250 is configured to detect a power down of the second supply voltage AVDD, and to generate a signal AVDD_DOWN to inform the AVDD power down to other circuit, such as the active feedback control circuit 260 and the like, to operate accordingly in an embodiment. In the FIG. 2 example, the power-down detecting includes two resistors R1 and R2, a diode D, a capacitor C and an operational amplifier A. These elements are coupled together as shown in FIG. 2.

During operation, in an example, when the second supply voltage AVDD has been powered up, the capacitor C is charged to a voltage level determined by the second supply voltage AVDD and a voltage divider formed by the two resistors R1 and R2. Generally, the voltage level on the capacitor C is lower than the second supply voltage AVDD. The operational amplifier A receives the voltage on the capacitor C at the inverting input and receives the second supply voltage AVDD at the non-inverting input, and thus the operational amplifier outputs a relatively high voltage, such as about the same level as the second supply voltage AVDD, for the signal AVDD_DOWN when the second supply voltage AVDD is powered up. The relatively high voltage of the signal AVDD_DOWN is indicative of the second supply voltage AVDD being powered-up.

When the second supply voltage AVDD is powered down, the voltage level of the second supply voltage AVDD drops. The voltage level on the capacitor C remains about the same due to connection of the diode D. When the second supply voltage AVDD drops below the voltage level on the capacitor C, the operational amplifier A outputs a relatively low voltage, such as about the ground level, for the AVDD_DOWN. The relatively low voltage of the signal AVDD_DOWN is indicative of the second supply voltage being powered-down.

In the FIG. 2 example, the relatively low voltage level in the signal AVDD_DOWN is used to indicate a detected AVDD power down. The power down detection circuit 250 can be suitably modified to use a relatively high voltage level to indicate a detected AVDD power down.

The active feedback control circuit 260 is configured to generate a feedback signal (FEEDBACK), and to provide the feedback signal to a voltage regulator, such as the first voltage regulator 110, to regulate the first supply voltage VDD. The active feedback control circuit 260 is powered at least partially by the second supply voltage AVDD. The active feedback control circuit 260 is configured to be disengaged from the feedback signal in response to a power down of the second supply voltage AVDD.

When the active feedback control circuit 260 is disengaged from the feedback signal, the feedback signal is generated based on the passive circuit 240. In an example, the passive circuit 240 includes a resistor R3 that couples the feedback signal to the first supply voltage VDD, and thus the feedback signal has about the same voltage level as the first supply voltage VDD when the active feedback control circuit 260 is disengaged from the feedback signal.

In the FIG. 2 example, the active feedback control circuit 260 includes a feedback driver 261, a feedback generation circuit 263 and a logic circuit 265 coupled together as shown in FIG. 2.

In an embodiment, the feedback generation circuit 263 is configured to determine an adjustment to the first supply voltage VDD and generate a signal indicative of the adjustment. In an example, the feedback generation circuit 263 includes digital circuits configured to generate a digital value indicative the adjustment to the first supply voltage VDD. The digital circuits are powered by the first supply voltage VDD. In an embodiment, the feedback generation circuit 263 is part of an adaptive voltage scaling (AVS) circuit to determine the adjustment to the first supply voltage VDD in order to meet circuit performance requirement, such as disclosed in Applicant's U.S. Pat. No. 8,370,654, issued Feb. 5, 2013 and assigned to Marvell, which is incorporated herein by reference in its entirety. In an example, the digital value indicates one of increasing first supply voltage VDD by a voltage step, decreasing the first supply voltage VDD by a voltage step, and no adjustment to the first supply voltage VDD.

The feedback driver 261 receives the digital value indicative of the determined adjustment, and drives the feedback signal accordingly. In an example, the feedback driver 261 is configured to drive the feedback signal having a voltage level as a sum of the present first supply voltage VDD and the adjustment. According to an aspect of the disclosure, the feedback signal (FEEDBACK) is an analog signal, and the feedback driver 261 uses analog techniques to drive the feedback signal. The feedback driver 261 includes analog circuits powered by the second supply voltage AVDD.

According to an aspect of the disclosure, the feedback driver 261 is configured to have a state of a high output impedance. In an example, when the feedback driver 261 is disabled, an output buffer in the feedback driver 261 is floating and has a high output impedance. When the feedback driver 261 is in the high impedance state, the feedback driver 261 is disengaged from the feedback signal. When the feedback driver 261 is disengaged from the feedback signal, the feedback signal is generated based on the first supply voltage VDD via the passive circuit 240.

The logic circuit 265 is configured to generate an enable signal (DRIVER_ENABLE) to enable or disable the feedback driver 261 based on signals from the power-up detecting circuit 270 and the power-down detecting circuit 250. In an example, when the signal from the power-up detecting circuit 270 is indicative of a power-up of both the first supply voltage VDD and the second supply voltage AVDD, the logic circuit 265 provides the enable signal to enable the feedback driver 261. When the signal from power-down detecting circuit 250 is indicative of a power down of the second supply voltage AVDD, the feedback generation circuit 263 gradually changes the output to zero as the adjustment, and then forwards the information to the logic circuit 265. When the logic circuit 265 receives the power down information of the second supply voltage AVDD, the logic circuit 265 changes the value of the enable signal to disable the feedback driver 261. When the feedback driver 261 is disabled, the feedback driver 261 enters the high output impedance state. In an example, the timings of the active feedback control circuit 260 are suitably tuned so that feedback driver 261 enters the high output impedance state before being disabled.

In an embodiment, the passive circuit 240 is selectively coupled to the output of the feedback driver 261 when the first feedback signal is disengaged from the active feedback control circuit 260. In another embodiment, the passive circuit 240 coupled to the output of the feedback driver 261 and is configured to have a resistivity between a low output impedance and a high output impedance (e.g. high-Z, tri-stated, floating) of the feedback driver 261. When the feedback driver 261 drives the feedback signal, the feedback driver 261 has the low output impedance and the passive circuit does not significantly affect the feedback signal. When the feedback driver 261 is disabled and thus has the high output impedance, the feedback signal is governed by the first supply voltage VDD via the passive circuit 240.

Figure 3:
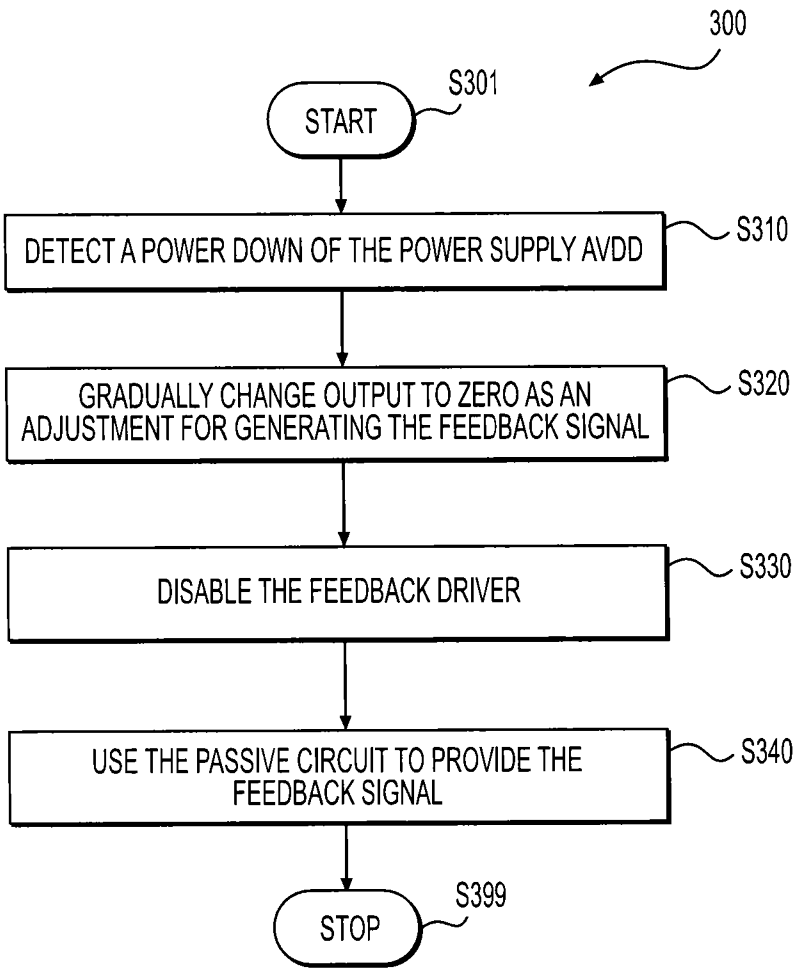
FIG. 3 shows a flowchart outlining a process example 300 according to an embodiment of the disclosure.

FIG. 3 shows a flow chart outlining a process example 300 for safe shutoff operation in response to a power down according to an embodiment of the disclosure. In an example, the process is executed by an IC chip in an electronic system, such as the IC chip 230, the IC chip 130 in the electronic system 100, and the like. The process starts at S301, and proceeds to S310.

At S310, a power down of a power supply is detected. The power supply is used by a circuit for generation of a feedback signal used to regulate another power supply. In the FIG. 2 example, the power-down detecting circuit 250 detects a power down of the second supply voltage AVDD. In an example, the second supply voltage AVDD drives the active feedback control circuit 260 that generates, for example, the first feedback signal 111. The first feedback signal 111 is used by the first voltage regulator 110 to adjust the first supply voltage VDD.

At S320, an adjustment for generating the feedback signal is set to zero. In the FIG. 2 example, in response to the power down of the second supply voltage AVDD, the feedback generation circuit 263 gradually changes its outputs to zero as the adjustment for generating the first feedback signal 111 for example.

At S330, a feedback driver is disabled. In the FIG. 2 example, when the power down of the supply voltage AVDD is detected, the feedback generation circuit 263 also informs the logic circuit 265. The logic circuit 265 then changes the value of the enable signal DRIVER_ENABLE to disable the feedback driver 261. In an example, when the feedback driver 261 is disabled, the feedback driver 261 enters the high output impedance state. Thus, the active feedback control circuit 260 is disengaged from the first feedback signal 111 for example.

At S340, the feedback signal is then driven independent of the second supply voltage AVDD. In the FIG. 2 example, after the feedback driver 261 is configured into the high output impedance state and disabled, the feedback driver 261 is disengaged from the feedback signal. The feedback signal is then provided based on the supply voltage VDD via the passive circuit 240, and is independent of the second supply voltage AVDD. In an embodiment, the passive circuit 240 is selectively coupled to the output of the feedback driver 261 when the first feedback signal is disengaged from the active feedback control circuit 260. In another embodiment, the passive circuit 240 is configured to have a resistivity between a low output impedance and a high output impedance (e.g. high-Z, tri-stated, floating) of the feedback driver 261. When the feedback driver 261 drives the feedback signal, the feedback driver 261 has the low output impedance and the passive circuit does not significantly affect the feedback signal. When the feedback driver 261 is disabled and thus has the high output impedance, the feedback signal is governed by the first supply voltage VDD via the passive circuit 240. The process then proceeds to S399 and terminates.

Figure 4:
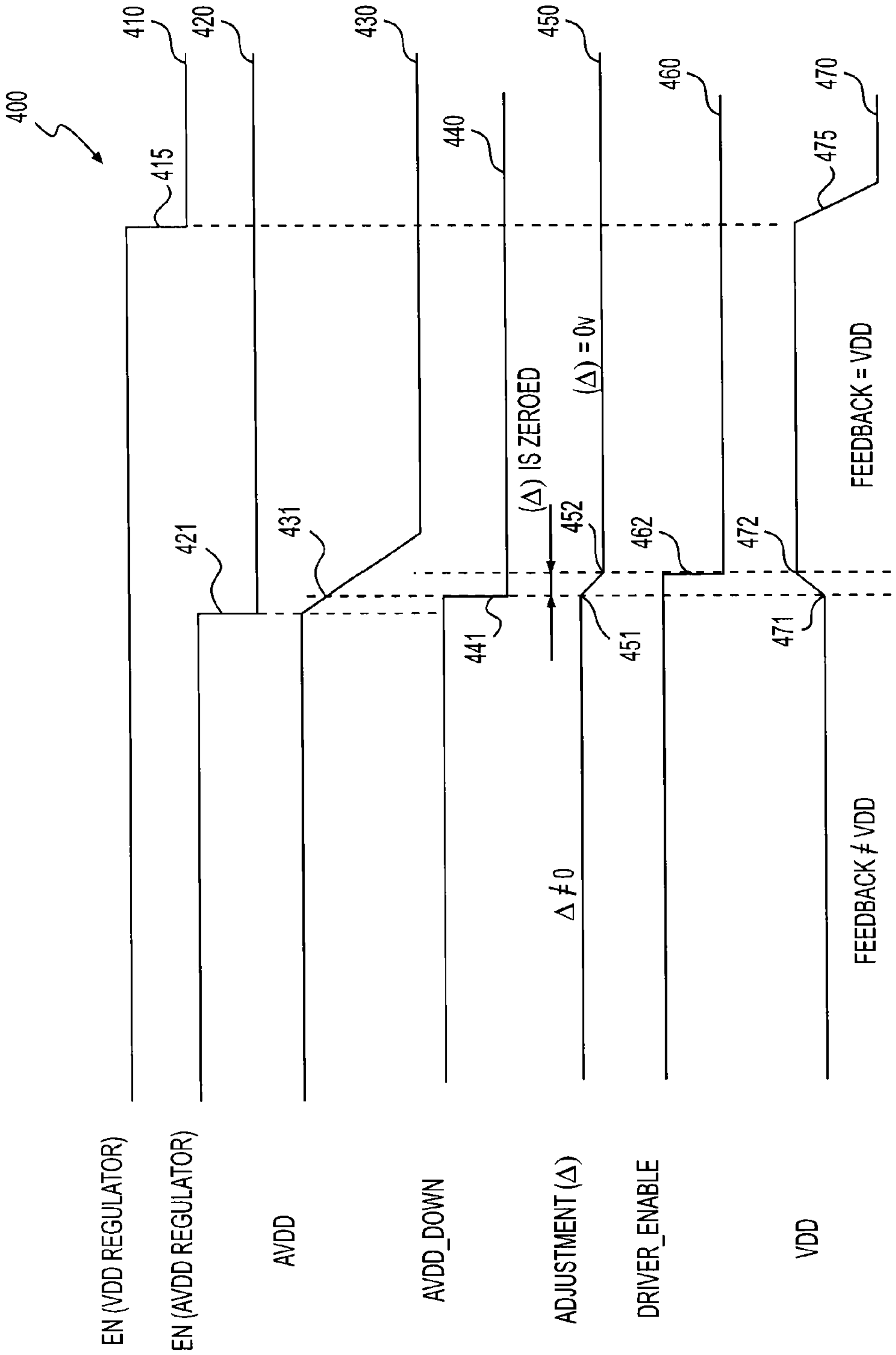
FIG. 4 shows a plot 400 of waveforms according to an embodiment of the disclosure.

FIG. 4 shows a plot 400 of signal waveforms changing with time according to an embodiment of the disclosure. The plot 400 includes a first waveform 410 for an enable signal provided to the EN pin of the first voltage regulator 110 (VDD regulator), a second waveform 420 for an enable signal provided to the EN pin of the second voltage regulator 120 (AVDD regulator), a third waveform 430 for the second supply voltage AVDD, a fourth waveform 440 for the signal AVDD_DOWN output from the power-down detecting circuit 250 in FIG. 2, a fifth waveform 450 for the adjustment determined by the feedback generation circuit 263, a sixth waveform 460 for the enable signal DRIVER_ENABLE generated by the logic circuit 265 in FIG. 2, and the seventh waveform 470 for the first supply voltage VDD.

According to the waveforms, the second voltage regulator 120 (AVDD regulator) is powered down in response to a falling edge 421 of the enable signal provided to the EN pin of the second voltage regulator 120. In this example, the enable signal can be provided by a system controller according to a power down sequence. According to the power down sequence, the second voltage regulator 120 is powered down before the first voltage regulator 110. For example, the power down sequence is determined without knowledge of circuit details in the IC chip 130. In another example, a power down of the second voltage regulator 120 is caused by a power crash of the power source. When the second voltage regulator 120 is powered down, the second supply voltage AVDD starts dropping, as shown by 431 in FIG. 4.

When the second supply voltage AVDD drops to a certain level, the power-down detecting circuit 250 detects the power down, and quickly changes the signal AVDD_DOWN from a relatively high voltage level to a relatively low voltage level to indicate the power down, as shown by 441 in FIG. 1.

When the feedback generation circuit 263 receives the signal AVDD_DOWN indicative of the power down, the feedback generation circuit 263 gradually changes its output to zero as the adjustment for generating the feedback signal, as shown by 451 and 452 in FIG. 4. In addition, the feedback generation circuit 263 informs the logic circuit 265. The logic circuit 265 changes the value of the enable signal DRIVER_ENABLE to disable the feedback driver 261, as shown by waveform 462.

When the feedback driver 261 is disabled, the feedback driver 261 enters the high output impedance state, and is disengaged from the feedback signal. In an embodiment, a passive circuit, such as the passive circuit 240, and the like is selectively coupled to the output of the feedback driver 261 when the first feedback signal is disengaged from the active feedback control circuit 260. The feedback signal is then governed by the first supply voltage VDD via the passive circuit. In the FIG. 4 example, before the power down of the second supply voltage AVDD, the feedback generation determines a positive adjustment for the feedback signal, the feedback signal is a sum of adjustment and present first supply voltage VDD. Thus, the first supply voltage VDD is regulated to have a reduced voltage level.

After the power down of the second supply voltage AVDD, the adjustment is set to zero. In an example, the feedback signal is provided based on the first supply voltage VDD and is about the same level as the first supply voltage VDD.

Further as seen from the waveforms, the first voltage regulator 110 (VDD regulator) is powered down in response to a falling edge 415 of the enable signal provided to the EN pin of the first voltage regulator 110, and then the first supply voltage VDD drops to zero, as shown by 475 in FIG. 4.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An integrated circuit (IC) chip, comprising:

a feedback control circuit configured to govern a feedback signal to a first regulator that regulates a first power supply to the IC chip based on the feedback signal, the feedback control circuit being powered at least partially by a second power supply; and a detecting circuit configure to detect a power down of the second power supply, and to cause the feedback control circuit to be disengaged from the feedback signal in response to the power down.

2. The IC chip of claim 1, further comprising:

a circuit configured to provide the feedback signal based on the first power supply when the feedback control circuit is disengaged from the feedback signal.

3. The IC chip of claim 1, wherein the feedback control circuit comprises:

a driving circuit configured to be powered by the second power supply to drive the feedback signal for regulating the feedback signal; and an enable/disable circuit configured to disable the feedback driving circuit in response to the power down of the second power supply in order to disengage the feedback control circuit from the feedback signal.

4. The IC chip of claim 3, wherein the feedback control circuit further comprises:

a feedback generation circuit configured to determine an adjustment to the first power supply.

5. The IC chip of claim 4, wherein the feedback generation circuit is configured to gradually change the adjustment to zero in response to the power down of the second power supply.

6. The IC chip of claim 5, wherein the feedback generation circuit is configured to gradually change the adjustment to zero before the enable/disable circuit disables the feedback driving circuit.

7. The IC chip of claim 3, wherein the driving circuit is configured to have a higher output impedance than a passive circuit in response to the power down of the second power supply and to be disengaged from the feedback signal.

8. The IC chip of claim 1, wherein the first power supply provides power to digital circuitry in the IC chip and the second power supply provides power to analog circuitry in the IC chip.

9. A method, comprising:

detecting a power down of a second power supply that at least partially powers a feedback control circuit, the feedback control circuit adjusting a feedback signal to a regulator that regulates a first power supply based on the feedback signal; and causing the feedback control circuit to be disengaged from the feedback signal in response to the power down of the second power supply.

10. The method of claim 9, further comprising:

providing the feedback signal via a circuit based on the first power supply when the feedback control circuit is disengaged from the feedback signal.

11. The method of claim 9, wherein causing the feedback control circuit to be disengaged from the feedback signal in response to the power down of the second power supply further comprises:

driving the feedback signal based on the second power supply for regulating the feedback signal; and disabling the driving of the feedback signal in response to the power down of the second power supply in order to disengage the feedback control circuit from the feedback signal.

12. The method of claim 11, wherein driving the feedback signal based on the second power supply for regulating the feedback signal further comprises:

determining an adjustment to the first power supply; and generating the feedback signal based on the first power supply and the adjustment.

13. The method of claim 12, further comprising:

gradually changing the adjustment to zero in response to the power down of the second power supply.

14. The method of claim 13, wherein gradually changing the adjustment to zero before disabling the driving of the feedback signal based on the second power supply.

15. The method of claim 11, further comprising:

entering a high output impedance state to be disengaged from the feedback signal.

16. A system, comprising:

a first regulator configured to provide a first power supply based on a feedback signal;

a second regulator configured to provide a second power supply; and an integrated circuit (IC) chip configured to operate based on the first power supply and the second power supply, the IC chip comprising:

a feedback control circuit configured to govern the feedback signal to the first regulator, the feedback control circuit being powered at least partially by the second power supply; and a detecting circuit configure to detect a power down of the second power supply, and to cause the feedback control circuit to be disengaged from the feedback signal in response to the power down.

17. The system of claim 16, further comprising:

a circuit configured to provide the feedback signal based on the first power supply when the feedback control circuit is disengaged from the feedback signal.

18. The system of claim 16, wherein the feedback control circuit comprises:

a driving circuit configured to be powered by the second power supply to drive the feedback signal; and an enable/disable circuit configured to disable the driving circuit in response to the power down of the second power supply in order to disengage the feedback control circuit from the feedback signal.

19. The system of claim 18, wherein the feedback control circuit further comprises:

a feedback generation circuit configured to determine an adjustment to the first power supply, and generate the feedback signal based on the first power supply and the adjustment.

20. The system of claim 19, wherein the feedback generation circuit is configured to gradually change the adjustment to zero in response to the power down of the second power supply.

* * * * *